(12) United States Patent
Baek et al.

(10) Patent No.: US 7,452,567 B2
(45) Date of Patent: Nov. 18, 2008

(54) METHOD FOR FABRICATING COLOR FILTER OF LIQUID CRYSTAL DISPLAY DEVICE

(75) Inventors: Myoung Kee Baek, Gyeonggi-Do (KR); Kwon Shik Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 181 days.

(21) Appl. No.: 10/423,008

(22) Filed: Apr. 25, 2003

(65) Prior Publication Data

US 2004/0127135 A1 Jul. 1, 2004

(30) Foreign Application Priority Data

Dec. 27, 2002 (KR) .................. 10-2002-0085635

(51) Int. Cl.
*B05D 5/12* (2006.01)
(52) U.S. Cl. ........................... 427/58; 427/164
(58) Field of Classification Search ............ 427/58, 427/164
See application file for complete search history.

(56) References Cited

U.S. PATENT DOCUMENTS

| | | | |
|---|---|---|---|
| 4,294,650 A | 10/1981 | Werthmann | 156/660 |
| 5,259,926 A | 11/1993 | Kuwabara et al. | 156/659.1 |
| 5,514,503 A | 5/1996 | Evans et al. | 430/7 |
| 5,544,582 A | 8/1996 | Bocko et al. | 101/211 |
| 5,678,483 A | 10/1997 | Johnson | 101/153 |
| 5,693,375 A * | 12/1997 | Sato et al. | 427/522 |
| 5,701,815 A | 12/1997 | Bocko et al. | 101/211 |
| 6,001,515 A | 12/1999 | Evans et al. | 430/7 |
| 6,356,318 B1 | 3/2002 | Kawahata | 349/38 |
| 6,730,356 B2 * | 5/2004 | Kim et al. | 427/256 |
| 2003/0026896 A1 * | 2/2003 | Shinkoda et al. | 427/162 |

FOREIGN PATENT DOCUMENTS

| | | |
|---|---|---|
| CN | 1321254 A | 11/2001 |
| EP | 0 471 628 A1 | 2/1992 |
| JP | 63205608 | 8/1988 |
| JP | 4094115 | 2/1992 |
| JP | 5011270 | 1/1993 |
| JP | 08-190011 | 7/1996 |
| JP | 2001-356710 | 12/2001 |
| JP | 2002-118124 | 4/2002 |

* cited by examiner

*Primary Examiner*—Timothy Meeks
*Assistant Examiner*—David Turocy
(74) *Attorney, Agent, or Firm*—McKenna Long & Aldridge LLP

(57) ABSTRACT

A method for fabricating a color filter of an LCD device includes: providing a cliché having a plurality of grooves; filling Red, Green and Blue colored inks into the grooves of the cliché; and repositioning the Red, Green and Blue colored inks onto a substrate of the LCD device.

12 Claims, 4 Drawing Sheets

METHOD FOR FABRICATING COLOR FILTER OF LIQUID CRYSTAL DISPLAY DEVICE

This application claims the benefit of the Korean Application No. 2002-85635 filed in Korea on Dec. 27, 2002, which is hereby incorporated by reference in its entirety.

BACKGROUND OF THE INVENTION

1. Field of the Invention

The present invention relates to a liquid crystal display device, and particularly, to color filters in a liquid crystal display device and a method of fabricating thereof.

2. Description of the Related Art

A cathode ray tube (CRT) monitor has mainly been used for displaying information in TV and computer so far. The CRT has high image quality and brightness. However, as an image screen grows larger, the depth of the CRT monitor becomes so big that the monitor occupies a very large volume. In addition, the weight of the CRT display has always been a problem in portable devices.

To address the problems above, flat panel display devices, such as liquid crystal displays, plasma display panels, organic electro luminescence displays, light emitting diodes and, field emission displays, have been used instead of a CRT monitor. Among these flat panel display devices, the liquid crystal display (LCD) device is used as a monitor of a notebook PC or of a desktop PC because the LCD has low power consumption. Color filters and a manufacturing thereof for a related art LCD device having all kinds of display applications will be described in detail with reference to FIGS. 1, 2A and 2B.

FIG. 1 is a view showing a cross-section of a related art general LCD device. As shown in FIG. 1, the LCD device includes a lower substrate 10, an upper substrate 20, and a liquid crystal layer 15 formed in between the upper and lower substrates 10 and 20. A thin film transistor T and a pixel electrode 7 are formed on the lower substrate 10. The thin film transistor T includes: a gate electrode 1 to which a scan signal is applied; a semiconductor layer 3 for transmitting a data signal corresponding to the scan signal; a gate insulating layer 2 for isolating the semiconductor layer 3 and the gate electrode 1 electrically; a source electrode 4 formed on an upper part of the semiconductor layer 3 for applying the data signal; and a drain electrode 5 applying the data signal to the pixel electrode 7. The semiconductor layer 3 comprises an active layer 3a formed by depositing amorphous silicon (a-Si), and an n+ doped ohmic contact layer 3b on both upper sides of the active layer 3a. A passivation layer 6 and the pixel electrode 7 are formed on the thin film transistor T, and a first alignment layer 4a formed for aligning liquid crystal molecules is formed on an upper part of the pixel electrode 7. The pixel electrode 7 is made by a transparent conductor, such as indium tin oxide (ITO) or indium zinc oxide (IZO), so that the light can be transmitted through the pixel electrode.

A black matrix 12 is formed on the upper substrate 20 for preventing the light from leaking between pixels, and color filters 11 of Red R, Green G, and Blue B for realizing actual colors are formed on the black matrix 12. A flattening layer (not shown) can be additionally formed on the color filter 11 for flattening the color filter and for improving an adhesive bond to a common electrode 13 subsequently formed on the color filter. The common electrode 13 is for applying voltage to the liquid crystal layer 15. A second alignment layer 4b for aligning the liquid crystal molecules is formed on the common electrode 13. A transparent conductor, such as ITO or IZO, is used as the common electrode 13 such that the light can be transmitted through the common electrode.

The LCD device is made by repeating processes, such as thin film deposition, and photolithography and etching processes, for each color used in the LCD device. Fabrication methods for color filters include: the stain method, pigment disperse method, and an electrophoresis deposition method. These three kinds of methods fabricate red, green, and blue primary color filters through three or more processes for each color of color filter.

The stain method includes processes for imparting photosensitivity to stainable polymer material, forming stain-subjected pattern, and staining the pattern with respective colors. In the color filter fabrication method of the stain method, a process of passing a stainable photosensitive film through the stain pattern is repeated for the respective R, G and B colors. Subsequently, the next step is forming a top coat layer.

The electrophoresis deposition method includes steps of forming electrophoresis deposition layers by extracting respective colors by electrophoresis. However, the process for forming the electrophoresis deposition layers on a transparent conductive layer has to be repeated three times to achieve each of the respective colors. Therefore, the fabrication process for the color filter takes a lot of time and has complicated process operations.

The pigment disperse method includes the steps of making a colored resist by dispersing the pigment on a resin and applying respective colored patterns. The steps of applying the colored resist and forming the colored pattern are repeated to achieve each of the respective red, green and blue colors, and therefore, fabrication time is increased and cost is increased. Also, to form the respective R, G and B color filters, the colored resist is deposited across the entire substrate and portions except the necessary portion should be removed. Since only ⅓ of the entire resist sheet is needed, ⅔ of the entire resist sheet should be removed, and therefore, the resist is heavily wasted.

An ink jet method for forming the color filters precisely were the color filters should be positioned on an LCD device has been suggested for solving the problems in the above methods. The ink jet method Red R, Green G and Blue B colored inks through an injection nozzle of an ink jet device onto to the lower substrate. The ink jet method can be used in the thin film transistor on color filter LCD device structure to preventing color filter mis-alignment and to improve the aperture rate.

FIGS. 2A and 2B are views showing a fabrication method for a color filter of an LCD device in the ink jet method of the related art. As shown in FIG. 2A, the gate electrode 51, the gate insulating layer 52 and the semiconductor layer 53 of a thin film transistor are formed on the transparent lower substrate 50. Source and drain electrodes 54 and 55, which are separated from each other with a predetermined gap, are formed on the semiconductor layer 53 using photolithography. In addition, a photoresist is patterned to form an ink separating wall 56. A passivation layer 57 is then formed on the upper part of the wall 56 to protect the thin film transistor T.

As shown in FIG. 2B, the respective R, G and B colored inks 60a are injected through the injection nozzle 60 into the pixels using the ink separating wall 56. Subsequently, the colored inks 60a solidify to form a color filter 59 in each respective pixel 59. Accordingly, the waste of ink can be prevented since it is precisely positioned. However, the color filters for each color all are positioned in a step separate from a step of positioning all of the color filters of another color. Therefore, the process is complex since subsequent color filters of one color have to be positioned amongst other already positioned color filters of another color.

SUMMARY OF THE INVENTION

Accordingly, the present invention is directed to a method for manufacturing an LCD device that substantially obviates one or more problems due to limitations and disadvantages of the related art.

An object of the present invention is to prevent ink from being wasted and to simplify processes for forming all of the color filters.

To achieve the object of the present invention, as embodied and broadly described herein, there is provided a method for fabricating a color filter of an LCD device including providing a cliché having a plurality of grooves; filling Red, Green and Blue colored inks into the grooves of the cliché; and repositioning the Red, Green and Blue colored inks onto a substrate of the LCD device.

In another aspect, a method for fabricating color filters of a Liquid Crystal Display (LCD) device includes: providing a cliché having a plurality of grooves; filling Red, Green and Blue colored inks into the grooves of the cliché; transferring the colored inks filled into the grooves of the cliché onto a printing roll; and applying the Red, Green and Blue colored inks onto a substrate of the LCD device from the printing roll.

In another aspect, a method for fabricating color filters of a Liquid Crystal Display (LCD) device includes: providing a cliché having grooves same as a pattern of color filters; filling Red, Green and Blue colored inks into the cliché concurrently with an ink jet; transferring the Red, Green and Blue colored inks filled into the grooves of the cliché onto the printing roll; and applying the Red, Green and Blue colored inks onto a substrate of the LCD device by rotating the printing roll across the substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
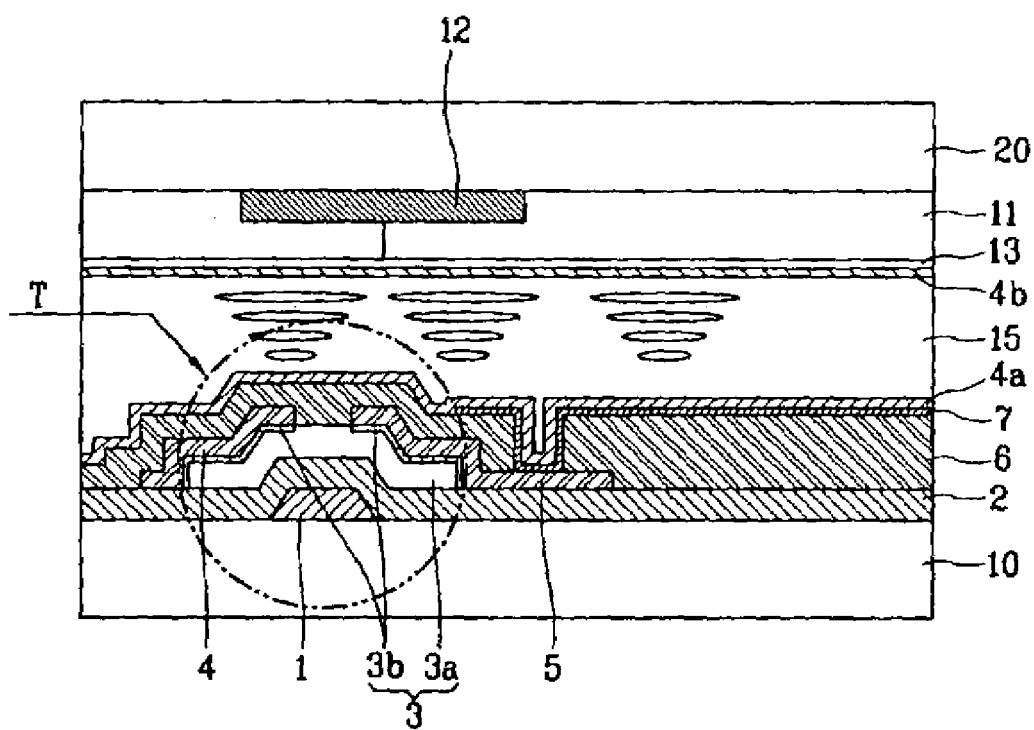
FIG. 1 is a cross-sectional view showing a general liquid crystal display (LCD) device in the related art.
Figure 2A:
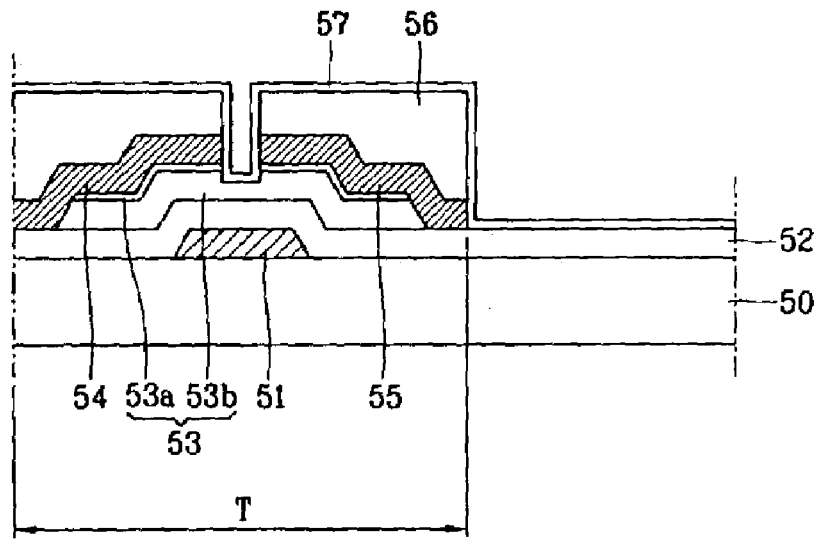
FIGS. 2A and 2B are views illustrating a method for fabricating color filter according to the related art in jet method.
Figure 2B:
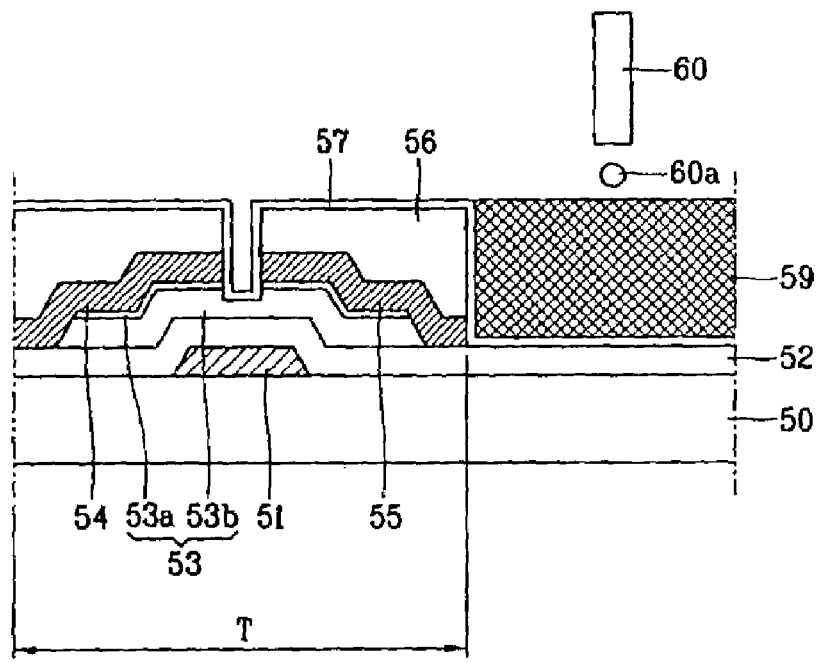
Figure 3A:
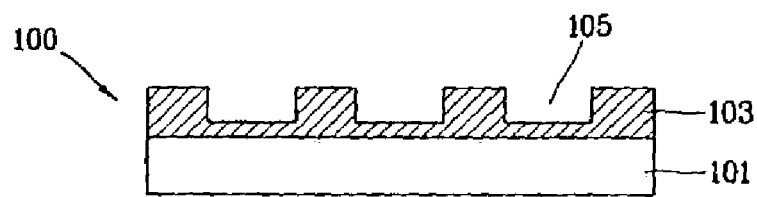
FIGS. 3A through 3F are views illustrating a method for fabricating color filter of LCD device according to exemplary embodiments of the present invention.

FIGS. 3A through 3F are processing views showing the method for fabricating color filters of an LCD device according to an exemplary embodiment of the present invention. As shown in FIG. 3A, a substrate 110 is provided with a buffer layer 103. For example, the buffer layer 103 can be a metallic, an organic or a silicon layer provided on the substrate 110. Subsequently, grooves 105 are formed in the buffer layer 103 through a photolithography process to form a cliché 100. The shape and position of the grooves 105 correspond to the R, G and B color filters, which will later be positioned on an LCD device.

Figure 3B:
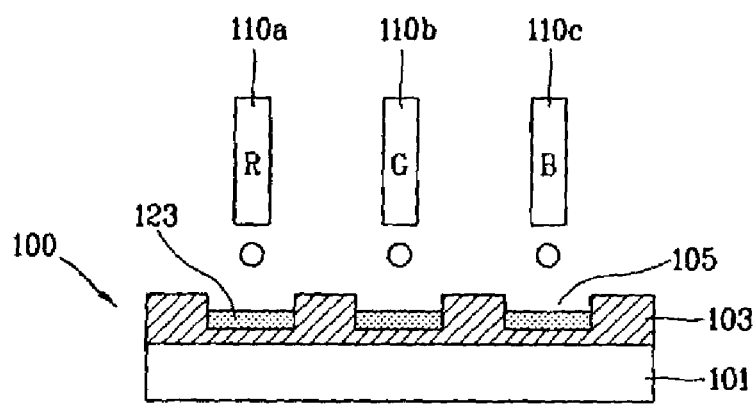

As shown in FIG. 3B, red, green and blue colored inks are filled into the grooves 105 through the injection nozzles 110a~110c of respective R, G and B ink jet devices. The filling of colored ink 123 into the grooves 105 can be performed using the ink jet method. In the alternative, the ink jet device can include an ink supplying unit divided into red, green and blue colors, nozzles through which the ink is injected, and channels that are disposed between the respective ink supplying unit and the nozzles, and paths for moving the ink. When the inks in the ink supplying unit is compressed, the inks of R, G and B colors are injected from the nozzles at the same time. Accordingly, the inks of R, G and B colors can be filled simultaneously or concurrently into the grooves 105 of the cliché 100. Thus, the ink filling time can be reduced and ink waste can be prevented.

Figure 3C:
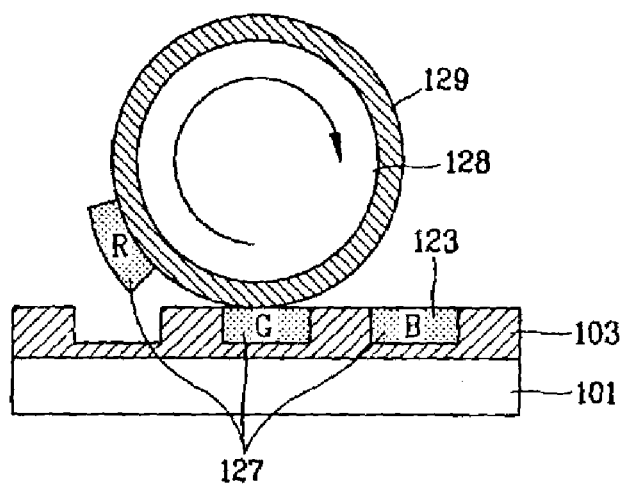
Figure 3D:
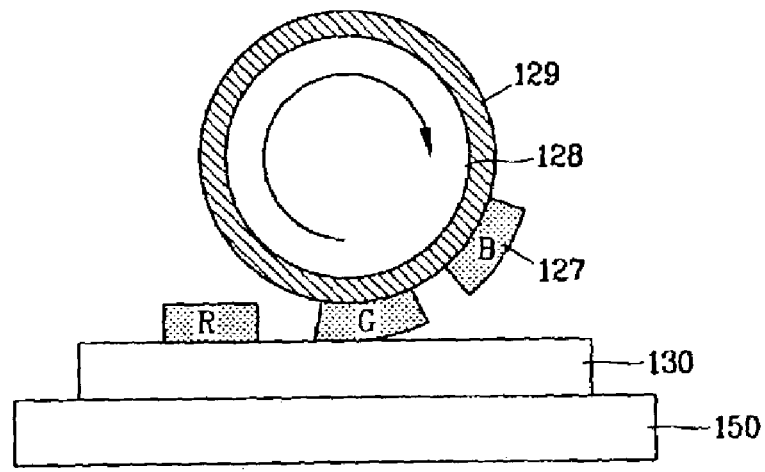

After the ink filling process is ended, the colored ink 123 filled into the cliché 100 is allowed to solidify. After the colored inks 123 have solidified enough to somewhat retain the shape of the groove 105, the colored inks 123 are separated from the buffer layer 103 and transferred onto a surface of a printing roll 128 as an ink pattern 127. As shown in FIG. 3C, a blanket 129 can be used on the surface of the printing roll 128 in order to improve adhesive bonding of the printing roll with the colored inks 123.

The buffer layer 103 makes the colored inks 123 separate easily from the cliché 100 such that the ink attaches onto the printing roll 128 easily and protects the substrate 130 from the shock of the printing roll 128. In other words, the adhesive bond of the colored ink 123 with the buffer layer 103 is weaker than the adhesive bond of the colored ink with the printing roll 128, and therefore, the ink will detach or be released from the buffer layer 103. In the alternative, the grooves 105 may be formed by etching the substrate without forming the buffer layer on the substrate 130. However, cracks may be generated on lower part of the substrate due to the impact of the printing roll 128. The buffer layer 103 protects the substrate by absorbing the impact of the printing roll 128.

The ink can be easily separated from the cliché 100 easily by using changes of adhesion property of the ink according to temperature differences between the cliché 100 and the printing roll 128. An ink having improved adhesion as temperature increases can be used such that the ink can be easily separated from the cliché 100 when the temperature of the printing roll 128 is set to be higher than that of the cliché 100. If the colored ink has the characteristic of improved adhesion as temperature decreases, the colored ink can be easily separated from the cliché 100 when the temperature of the printing roll 128 is set to be lower than that of the cliché 100.

After transferring the colored ink filled in the cliché 100 onto the printing roll 128, the ink pattern 127 formed on the printing roll 128 is moved to a stage 150 on which a substrate 130 is disposed. The ink patterns 127 of R, G and B colored inks 123 are applied onto the substrate 130 by rotating the printing roll only once across the substrate. The ink patterns 127 applied to the substrate 130 form the R, G and B color filters 127a~127c. The temperature of the substrate 130 can be controlled by installing a heater (not shown) in the stage 150 to make the ink patterns detach from the printing roll 128 and to make the ink patterns attach easily onto the substrate 130 easily. The heaters (not shown) is installed on the cliché

100, the printing roll 128, and on the stage 150 should be independably controllable and also should be able to maintain even temperatures throughout entire areas of the cliché 100, the printing roll 128 and the stage 150.

Figure 3E:
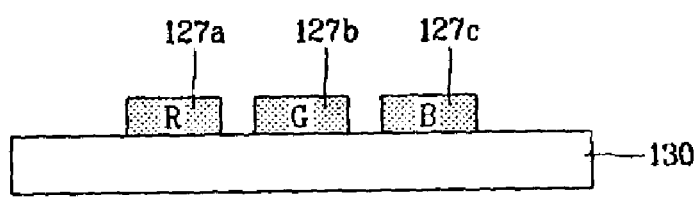

FIG. 3E shows color filters of R, G and B colors 127a, 127b and 127c formed on the upper substrate 130 of an LCD device according to the above described processes. Generally, the color filters are formed by combining an ink jet method with a printing method to prevent ink from being wasted and to simplify the processes. As described above, the R, G and B color filters are formed sequentially one after another across the substrate without stopping to repeat the process for another color.

Figure 3F:
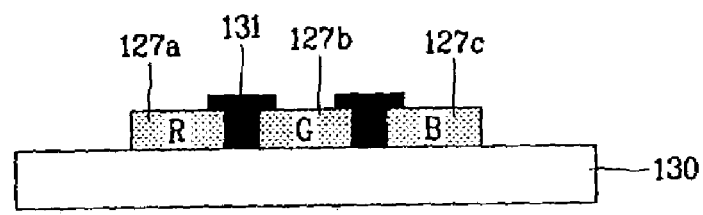

As shown in FIG. 3F, a black matrix 131 is deposited and patterned on the substrate 130 to be in between the R, G and B color filters 127a, 127b and 127c. The black matrix 131 can be a resin, a metal or some other opaque material. In the alternative, the black matrix 131 could be formed on the substrate 130 prior to the printing of the R, G and B color filters 127a, 127b and 127c. If the black matrix 131 is formed on the substrate 130 first, the R, G and B color filters 127a, 127b and 127c are printed on the substrate such that they are aligned within the black matrix.

As described above, according to the method for fabricating color filter of the present invention, the R, G and B color inks are filled on the groove of cliché in the ink jet method, and after that, the inks are printed on the substrate at once in the printing method, and thereby, the repeated processes in the related art can be omitted to improve producing efficiency. The colored inks can be filled in concurrently by the ink jet method, and thereby, the material cost can be reduced and a competitive price can be ensured.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for fabricating a color filter of an Liquid Crystal Display (LCD) device comprising:
   providing a cliché including a flat base layer and a buffer layer having a plurality of grooves thereon that only partially extend through the buffer layer;
   filling Red, Green and Blue colored inks into the grooves of the cliché; and
   repositioning the Red, Green and Blue colored inks onto a substrate of the LCD device, wherein repositioning further comprises:
   transferring the colored inks filled into the grooves of the cliché onto a printing roll by contacting and rotating the printing roll on the cliché in which the Red, Green and Blue colored inks are filled; and
   applying the Red, Green and Blue colored inks on the printing roll onto the substrate by rotating the printing roll across the substrate, wherein the buffer layer protects the substrate by absorbing the impact of the printing roll,
   wherein a first heater and a second heater are respectively provided to the cliché and the printing roll to heat the cliché and the printing roll to different temperatures, thereby adhesion between the printing roll and the ink is larger than adhesion between the cliché and the ink.

2. The method of claim 1, wherein filling includes placing the Red, Green and Blue colored inks into the grooves of the cliché concurrently.

3. The method of claim 1, wherein applying includes rolling the printing roll only once across the substrate.

4. The method of claim 1, further comprising:
   depositing a black matrix on the substrate in between the Red, Green and Blue colored inks.

5. The method of claim 4, wherein depositing a black matrix includes patterning a resin.

6. The method of claim 1, wherein repositioning the Red, Green and Blue colored inks includes aligning the Red, Green and Blue colored inks within a black matrix.

7. A method for fabricating color filter of a Liquid Crystal Display (LCD) device, comprising:
   providing a cliché including a flat base layer and a buffer layer having a plurality of grooves thereon that only partially extend through the buffer layer;
   filling Red, Green and Blue colored inks into the grooves of the cliché, wherein filling is performed using a plurality of ink jets;
   removing the Red, Green and Blue colored inks from the grooves of the cliché by transferring the colored inks filled into the grooves of the cliché onto a printing roll; and
   applying the Red, Green and Blue colored inks onto a substrate of the LCD device from the printing roll, wherein the buffer layer protects the substrate by absorbing the impact of the printing roll,
   wherein a first heater and a second heater are respectively provided to the cliché and the printing roll to heat the cliché and the printing roll to different temperatures, thereby adhesion between the printing roll and the ink is larger than adhesion between the cliché and the ink.

8. The method of claim 7, wherein filling includes placing Red, Green and Blue colored inks into the grooves of the cliché concurrently.

9. The method of claim 7, wherein applying includes rolling the printing roll across the substrate.

10. The method of claim 7, further comprising:
    depositing a black matrix on the substrate in between the Red, Green and Blue colored inks.

11. The method of claim 10, wherein depositing a black matrix includes patterning a resin.

12. The method of claim 7, wherein applying the Red, Green and Blue colored inks includes aligning the Red, Green and Blue colored inks within a black matrix.

* * * * *